(12) United States Patent
Zohar

(10) Patent No.: US 9,732,516 B2
(45) Date of Patent: Aug. 15, 2017

(54) OBJECT, SUCH AS A BUILDING, PROVIDED WITH A SYSTEM FOR PREVENTING DAMAGE FROM EARTHQUAKES TO THE OBJECT

(71) Applicant: Oshri Even Zohar, Amsterdam (NL)

(72) Inventor: Oshri Even Zohar, Amsterdam (NL)

( * ) Notice: Subject to any disclaimer, the term of this patent is extended or adjusted under 35 U.S.C. 154(b) by 30 days.

(21) Appl. No.: 14/440,002

(22) PCT Filed: Oct. 16, 2014

(86) PCT No.: PCT/EP2014/072175
§ 371 (c)(1),
(2) Date: Apr. 30, 2015

(87) PCT Pub. No.: WO2016/058643
PCT Pub. Date: Apr. 21, 2016

(65) Prior Publication Data
US 2016/0289958 A1 Oct. 6, 2016

(51) Int. Cl.
*E04B 1/98* (2006.01)
*E04H 9/02* (2006.01)
(Continued)

(52) U.S. Cl.
CPC .............. *E04B 1/985* (2013.01); *E02D 27/34* (2013.01); *E04H 9/021* (2013.01); *G01V 1/008* (2013.01); *G05B 13/021* (2013.01); *H04N 5/232* (2013.01)

(58) Field of Classification Search
CPC ...... E04B 1/985; G05B 13/021; G01V 1/008; E04H 9/021; H04N 5/232; E02D 27/34
See application file for complete search history.

(56) References Cited

U.S. PATENT DOCUMENTS 5,388,056 A * 2/1995 Horiuchi ................. G01M 7/06
700/30
5,452,548 A * 9/1995 Kwon .................... E01D 19/041
248/567

(Continued)

*Primary Examiner* — Jeanette E Chapman
(74) *Attorney, Agent, or Firm* — Marcus C. Dawes; Daniel L. Dawes

(57) ABSTRACT

An object, such as a building, provided with a system for preventing damage from earthquakes to the object, said system comprising:
  a foundation anchored to the ground;
  guide means mounted on said foundation and on said object arranged to allow relative displacement between the object and the foundation in at least one horizontal direction;
  at least one actuator arranged to displace said object in said at least one direction relative to said foundation;
  said at least one actuator being connected to a central processing unit;
said central processing unit being connected to at least one displacement sensor;
said at least one displacement sensor being arranged to detect in real time displacement of said foundation and/or the ground and/or said object and to input in real time data about said displacement to said central processing unit; and said processing unit being programmed to activate in real time said actuator in dependence on said data in such a manner that said object is displaced relative to said foundation in real time, such that the maximum displacement vector of the object relative to the earth's gravitational field is kept substantially smaller than the maximum displacement vector of said foundation relative to the earth's gravitational field.

17 Claims, 5 Drawing Sheets

(51) Int. Cl.
  *E02D 27/34* (2006.01)
  *G01V 1/00* (2006.01)
  *G05B 13/02* (2006.01)
  *H04N 5/232* (2006.01)

(56) References Cited

U.S. PATENT DOCUMENTS

| | | | | |
|---|---|---|---|---|
| 5,452,549 A * | 9/1995 | Medeot | ............... | E04H 9/021 52/167.1 |
| 5,816,559 A * | 10/1998 | Fujimoto | ............... | E04H 9/021 248/562 |
| 5,913,503 A * | 6/1999 | Satoh | ............... | A47F 3/00 248/562 |
| 6,089,525 A * | 7/2000 | Williams | ............... | G03F 7/70716 248/550 |
| 6,123,313 A * | 9/2000 | Otsuka | ............... | E04H 9/023 248/580 |
| 6,324,795 B1 * | 12/2001 | Stiles | ............... | E02D 27/34 52/167.4 |
| 6,631,593 B2 * | 10/2003 | Kim | ............... | E04H 9/023 248/562 |
| 7,070,153 B1 * | 7/2006 | Stenard | ............... | B60N 2/4242 248/157 |
| 8,015,760 B2 * | 9/2011 | Kemeny | ............... | E04H 9/02 248/580 |
| 8,838,671 B2 * | 9/2014 | Wies | ............... | G05B 19/00 709/203 |
| 9,103,485 B2 * | 8/2015 | Moreno | ............... | F16M 13/02 |
| 2003/0109992 A1 * | 6/2003 | Horiuchi | ............... | G01M 7/00 702/56 |
| 2004/0118057 A1 * | 6/2004 | Sanders | ............... | E04B 1/985 52/167.2 |
| 2004/0262487 A1 * | 12/2004 | Kawashima | ............... | E04H 9/023 248/638 |
| 2005/0241245 A1 * | 11/2005 | Tsai | ............... | E04H 9/023 52/167.1 |
| 2010/0320045 A1 * | 12/2010 | Muska | ............... | G08C 17/00 188/378 |

* cited by examiner

OBJECT, SUCH AS A BUILDING, PROVIDED WITH A SYSTEM FOR PREVENTING DAMAGE FROM EARTHQUAKES TO THE OBJECT

FIELD OF THE INVENTION

The invention relates to an object, such as a building, provided with a system for preventing damage from earthquakes to the object.

Disclosed here are methods and systems for eliminating the motions of objects that are caused by earthquakes. The present invention has the advantage of totally separating (rather than damping) the object's motions from the ground (earth) motions, keeping it fully motionless. Another advantage of the present invention is having minimal numbers of moving parts. In the described preferred embodiments, the methods of fully isolating sensitive objects from seismic waves are drawn.

The present invention is directed towards assisting in the elimination of earthquake damage caused to objects, buildings and structures and the prevention of people's injuries and structural damage caused by seismic events or other event causing vibrations in the earth's surface.

While the definition of "objects" pertain mainly to buildings and architectural constructions, it may also comprise without limitation, to sensitive machinery, engineering constructions and the like.

Earthquake shaking and damage are the result of many different types of elastic waves. Among the many types of seismic waves, one can make a broad distinction between body waves and surface waves. While body waves travel through the interior of the earth, surface waves travel across the surface. Surface waves decay more slowly with distance than body waves. Surface waves tend to cause more damage.

Body waves travel through the interior of the earth. They create refractions due to varying density and stiffness of the earth's interior. The main types of body waves are referred to as primary (P) waves and secondary (S) waves.

P-waves are compressional waves that are longitudinal in nature. P waves are pressure waves that travel faster than other waves through the earth to arrive at seismograph stations first, hence the name "primary". These waves can travel through any type of material, including fluids, and can travel at nearly twice the speed of S waves. In air, they take the form of sound waves, hence they travel at the speed of sound. Typical speeds are 300 m/s in air, 1450 m/s in water and about 5000 m/s in rock.

S-waves are shear waves that are transverse in nature. Following an earthquake event, S-waves arrive at seismograph stations after the faster-moving P-waves and displace the ground perpendicular to the direction of propagation. Depending on the propagation direction, the wave can take on different surface characteristics; for example, in the case of horizontally polarized S waves, the ground moves alternately to one side and then the other. S-waves can travel only through solids, as fluids (liquids and gases) do not support shear stresses. S-waves are slower than P-waves, and speeds are typically around 60% of that of P-waves in any given material.

Seismic surface waves travel along the earth's surface. They are called surface waves, as they diminish as they get further from the surface. Their velocity is lower than those of seismic body waves (P and S). Because of the long duration and large amplitude of the surface waves, they can be the most destructive type of seismic wave. Surface waves travel more slowly than the other type of seismic waves.

An earthquake occurs, seismographs near the epicenter are able to record both P and S waves, but those at a greater distance no longer detect the high frequencies of the first S wave. Since shear waves cannot pass through liquids.

Several alternative approaches have been traditionally utilized to dampen or limit earthquake damage. In the first approach, which is used commonly, involve strengthening the structures themselves, objects are made strong enough to withstand the largest anticipated earthquake. However, the maximum tremor magnitude of shaking is unpredictable. Also this method is quite expensive and is not necessarily suitable for all types of objects.

The second approach deals with isolation or damping from the vibration such that the objects do not experience a major portion of the seismic waves. In certain cases, isolation flooring, for example "earthquake isolation flooring", has been used or proposed. Such flooring has generally comprised of sliding plates, support frames that are mounted on the plates and a plurality of springs disposed horizontally between the support frame and the plate, a floor mounted on the support frame through vertically disposed springs, a number of dampers disposed vertically between the support frame and the floor, and a latch to secure the vertical springs during normal use.

There are other methods of damping the earthquake motions. Those involve different types of flexible dampers, ball bearing sliding structures and mass displacement mechanisms.

Bakker, U.S. Pat. No. 2,014,643, is drawn to a balance block for buildings comprising opposed inner concave surfaces with a bearing ball positioned between the surfaces to support the weight of a building superstructure.

Kemeny, U.S. Pat. No. 5,599,106 discloses ball-in-cone bearings.

Ishida et al., U.S. Pat. No. 4,371,143 have proposed an improved isolation floor that comprises length adjustment means for presetting the minimum acceleration required to initiate the isolation effects of the flooring in part by adjusting the length of the springs. The floor is said to automatically restore to its normal condition after having once been subjected to a seismic wave.

Stahl (U.S. Pat. No. 4,801,122) discloses a seismic isolator comprising a base plate connected to a floor and a frame. A moving member such as a pivoted lever is connected to a spring in the frame and to the base plate. The object is placed on top of the frame. Movement of the foundation and base plate relative to the frame and object causes compression of the lever and extension of the spring, which then exerts a restoring force through a cable anchored to the base plate; initial resistance to inertia is caused due to friction between the base plate and the frame; this friction can be decreased by using TEFLON® or other slick low friction material.

Kondo et al., U.S. Pat. No. 4,662,133 describes a floor system for seismic isolation of objects placed thereupon comprising a floor disposed above a foundation, a plurality of support members for supporting the floor in a manner that permits the movement of the floor relative to the foundation in a horizontal direction, and a number of restoring devices disposed between the foundation and the floor member. The restoring members comprise a two pair of slidable members, each pair of slidable members being movable towards and away from each other wherein one pair of slidable members is disposed at right angles from each other in the horizontal plane.

Yamada et al., U.S. Pat. No. 4,917,211 describe a seismic isolation apparatus placed between a foundation and a floor slab that comprises an upper friction plate affixed to an object to be protected from seismic acceleration comprising a material impregnated with oil, a lower friction plate comprising a hard chromium or nickel plate, and a horizontally placed spring system affixed to the object and the foundation to provide a restoring force. To reduce the response acceleration of the object even further, certain of the friction places may be replaced with ball bearings.

Fujimoto, U.S. Pat. No. 5,816,559 discloses a seismic isolation device similar to that of Kondo, as well as various other devices including one in which a rolling ball is disposed on the tip of a strut projecting downward from the floor in a manner similar to that of a ball point pen. The strut is received in a dish-shaped ball receiving plate. The strut may optionally be connected to a vertically disposed spring to provide a certain amount of dampening and restoring force in the vertical direction.

Stiles et al., U.S. Pat. No. 6,324,795 disclose a seismic isolation system between a floor and a foundation comprising a plurality of ball and socket joints disposed between a floor and a plurality of foundation pads or piers. In this isolation device, the floor is disposed above a hardened elastomeric material (or a spring), which is in turn disposed on top of an upper surface of a ball and socket joint and thus sandwiched between the floor and the ball and socket joint. The ball and socket joint comprises an upper socket portion bearing a portion of the weight of the floor and a lower portion comprising as ball protruding upwards from a plate affixed to the foundation pad or pier. The floor is therefore able to adjust to buckling pressure due to distortion of the ground beneath the foundation piers. However, the device disclosed is not designed to move horizontally in an acceleration-resisting manner.

Williams et al, U.S. Pat. No. 6,089,525 A disclose a six degree of freedom vibration isolation and payload reaction force compensation system includes a number of isolation legs which support equipment subject to undesirable vibrations. While this is an active device, it is not capable of inversing the ground movement within a real-time feedback loop that includes also the continuous monitoring of the payload center of mass and center of pressure.

SUMMARY OF THE INVENTION

According to a first aspect of the invention said system comprises: a foundation anchored to the ground; guide means mounted on said foundation and on said object arranged to allow relative displacement between the object and the foundation in at least one horizontal direction; at least one actuator arranged to displace said object in said at least one direction relative to said foundation;

According to a further aspect of the invention said at least one actuator is connected to a central processing unit; said central processing unit being connected to at least one displacement sensor; said at least one displacement sensor being arranged to detect in real time displacement of said foundation and/or the ground and/or said object and to input in real time data about said displacement to said central processing unit; and said processing unit being programmed to activate in real time said actuator in dependence on said data in such a manner that said object is displaced relative to said foundation in real time, such that the maximum displacement vector of the object relative to the earth's gravitational field is kept substantially smaller than the maximum displacement vector of said foundation relative to the earth's gravitational field.

Preferably said processing unit is programmed to activate in real time said actuator in dependence on said data in such a manner that said object is displaced relative to said foundation in real time, such that the maximum displacement vector of the object relative to the earth's gravitational field is kept at substantially zero.

In a first preferred embodiment said at least one displacement sensor includes a ground displacement sensor, said ground displacement sensor being arranged to detect in real time displacement of said foundation and/or the ground and to input in real time data about said displacement to said central processing unit, and said processing unit is programmed to activate in real time said actuator in dependence on said data in such a manner that said object is displaced relative to said foundation in real time at a displacement vector which is substantially the opposite of the displacement vector of said foundation or the ground relative to the earth's gravitational field.

Said processing unit is programmed to activate in real time said actuator in dependence on said data using a predictive feedback loop.

In a second preferred embodiment said at least one displacement sensor includes an object displacement sensor, said object movement sensor being arranged to detect in real time displacement of said object relative to the earth's gravitational field and to input in real time data about said object displacement to said central processing unit, and said processing unit is further programmed to activate in real time said actuator in dependence on said data about said object displacement, in such a manner that said object is being self-balanced on said guide means.

In a further preferred embodiment said object is being balanced on said guide means by using an inverted pendulum feedback control balancing algorithm (as explained on http://en.wikipedia.org/wiki/Inverted_pendulum, version as of 3 Oct. 2014, 15:44 WEST).

Said inverted pendulum feedback control balancing algorithm may for instance be a fuzzy controller algorithm (such as described in "Instrument Engineers Handbook" by Bela G. Liptak, Vol. 2 "Process Control and Optimization", Third Edition, Chapter 6.2 "Fuzzy Logic Control", the Fuzzy Controller Example on pages 706-708).

Said detected displacement of said object includes displacement of the bottom part of said object and of the upper part and/or the inclination of said object.

The features of the first and second preferred embodiments may also be combined into a third preferred embodiment.

Said at least one displacement sensor preferably includes a seismograph, an accelerometer, an optical motion capture device, an electro-magnetic motion capture device, an inertial motion capture device, and/or a mechanical motion capture device.

Said guide means preferably allow relative displacement between the object and the foundation in both horizontal directions.

According to a further aspect of the invention said guide means mounted on said foundation and on said object arranged to allow relative displacement between the object and the foundation in at least one horizontal direction comprises rails mounted on one of said foundation or object, and support means mounted on the other one of said foundation or object, wherein said support means are arranged to be supported by and move along said rails.

Preferably said guide means comprises two sets of said actuator, rails, support means arranged to displace said object relative to said foundation, said two sets extending on top of each other, wherein a first one of said rails extend in a first direction, and the second one of said rails extend in a second direction, wherein said second direction extends perpendicular to said first direction.

Preferably the actuator of said first set is arranged to displace the rails of said second set relative to a first one of said foundation and building, and the actuator of said second set is arranged to displace the second one of said foundation and building relative to the rails of said second set.

The invention also relate to a method for preventing damage from earthquakes to an object, such as a building, said method comprising: providing a foundation anchored to the ground; providing guide means mounted on said foundation and on said object arranged to allow relative displacement between the object and the foundation in at least one horizontal direction; providing at least one actuator arranged to displace said object in said at least one direction relative to said foundation; said at least one actuator being connected to a central processing unit; said central processing unit being connected to at least one displacement sensor; said at least one displacement sensor detecting in real time displacement of said foundation and/or the ground and/or said object and data about said displacement is input in real time to said central processing unit; and said processing unit activates in real time said actuator in dependence on said data in such a manner that said object is displaced relative to said foundation in real time, such that the maximum displacement vector of the object relative to the earth's gravitational field is kept substantially smaller than the maximum displacement vector of said foundation relative to the earth's gravitational field.

The present invention differs from the cited reference above, as it involves eliminating the propagation of the motions generated by the seismic waves to the objects in question. It is an active system that prevent the objects and the structures from moving. The system in this invention involves a real time feedback loop that inverses the input earthquake waves, keeping the objects or structures above it still. The proposed invention establishes an active dynamic foundation.

Foundations are usually comprising or built upon a continuous concrete slab at a ground level of a structure. Some foundations include a series of piers or other projections extending upward from the base level. Foundation are sometimes found at a level higher than a ground level.

The present invention is a novel active system for prevention of any damage to objects, buildings and structures from earthquake damages. The present invention presents a different step in the methods and systems used currently in seismic vibrations damping since it does not attempt to dampen the seismic waves but neutralize them completely in such a way that the objects, buildings and structures mounted on the system, remain still. The present invention is also cost effective, simple and practical solution to protecting such objects against, or limiting damage by, seismic or other severe vibrational energy.

The cost effectiveness is also achieved through large cost saving in the actual weight of the buildings mounted on it, since it is no longer necessary to strengthen the building structure against earthquake vibrations.

DETAILED DESCRIPTION

In a preferred embodiment, the system is comprised of an active foundation capable of two DoFs (Degrees of Freedom) and it can support also building superstructures.

Figure 1:
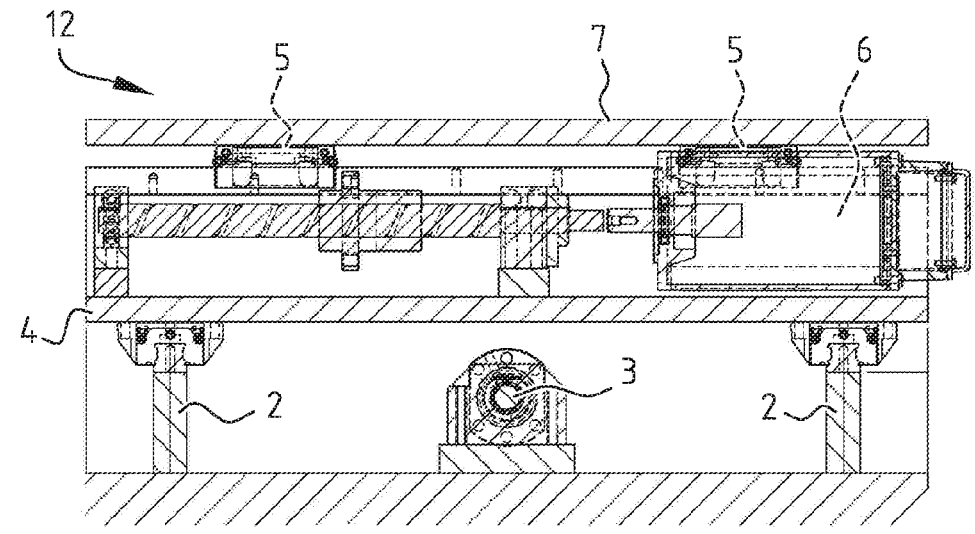
FIG. 1 shows a cross-section side view of the 2 DOF active foundation system elements.

In FIG. 1 a side view of the assembled active foundation 12 is drawn. The Ground anchored foundation 1 is a large embedded concrete structure that also includes two protruding rails/guides 2. On it are also mounted the motors and/or actuators 3 that are driving the single Dof moving plate 4 responsible for real time inversion of a single axis component of the lateral seismic ground motion. The single Dof moving plate 4 also has two protruding rails/guides, rotated 90 degrees compared to the rails/guides of the ground anchored foundation. Mounted on the single Dof moving plate 4 are also motors and/or actuators 6 that are driving the second Dof moving plate 5. The top plate 7 with object/payload 11 is moved in real time to inverse the second single axis component of the lateral seismic ground motion.

Figure 2:
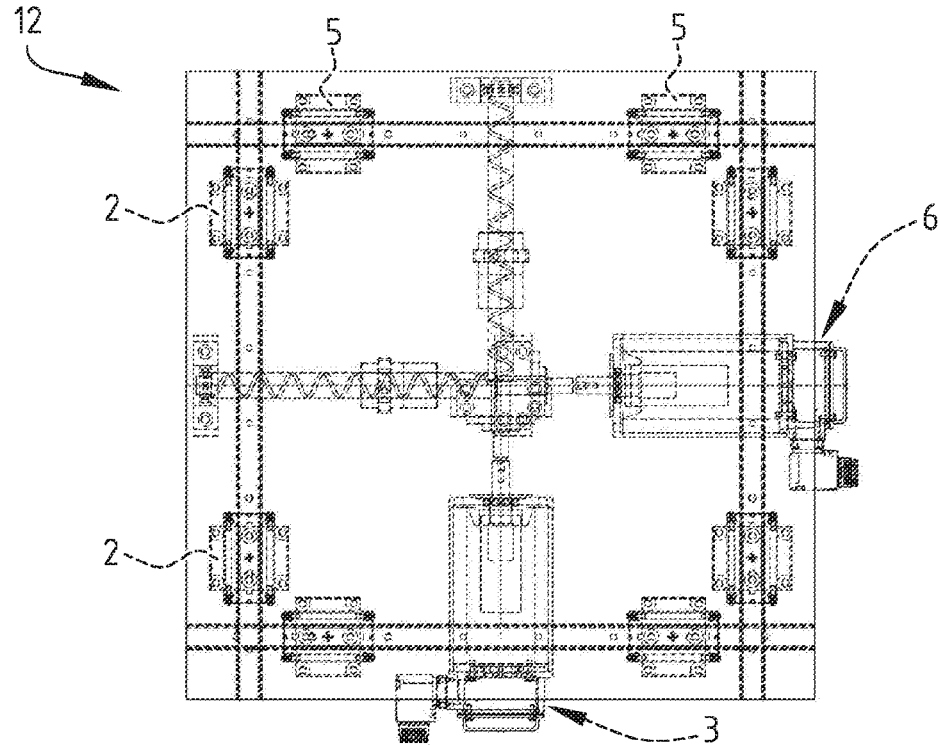
FIG. 2 shows a top view of the 2 DOF active foundation system elements.

FIG. 2 shows the same system elements from a top down view which assists in seeing the separate inversion of single axis seismic motion components.

Figure 3:
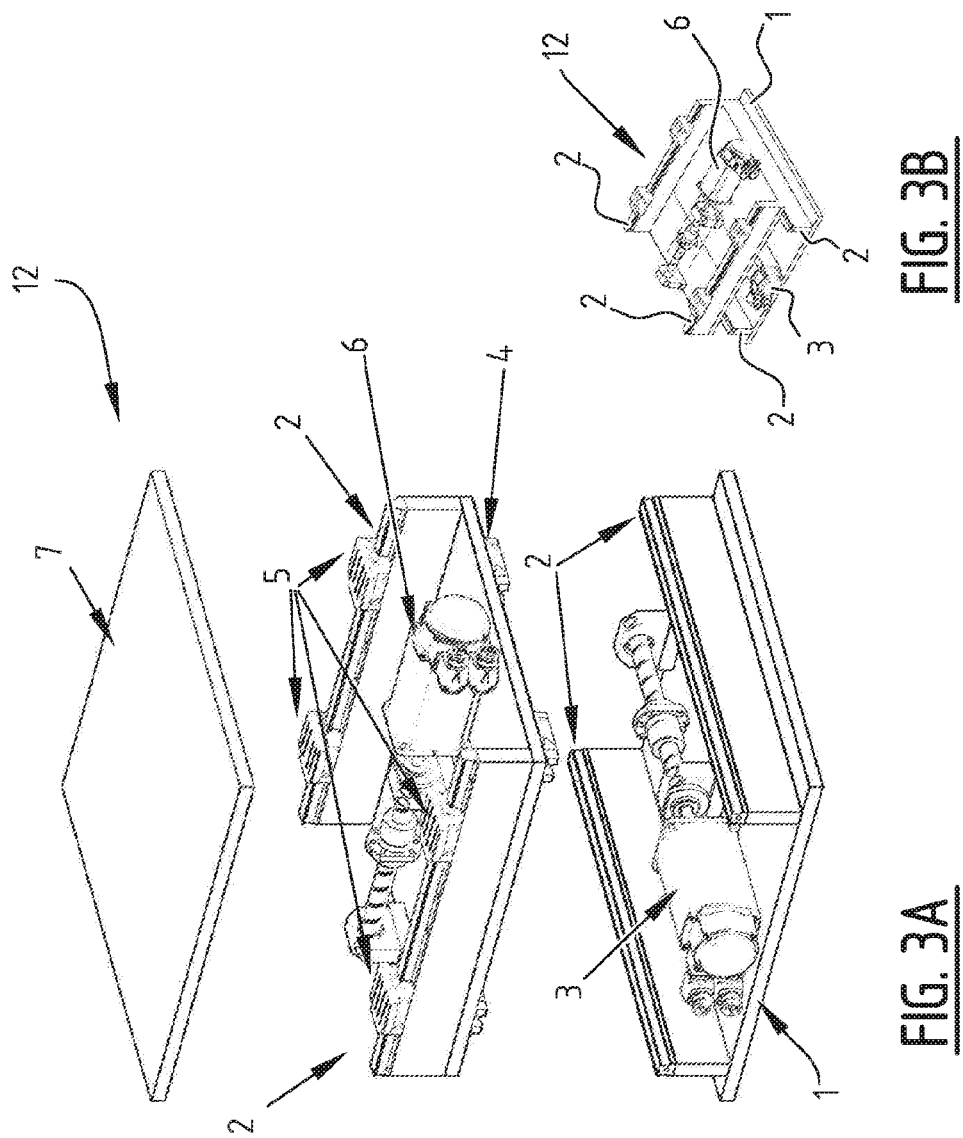
FIGS. 3A/B show an exploded perspective and an assembled view of the active foundation system elements configuration that has 2 active degrees of freedom.

FIG. 3 is rendered in a way that further helps in clarifying the active foundation system elements.

Figure 4:
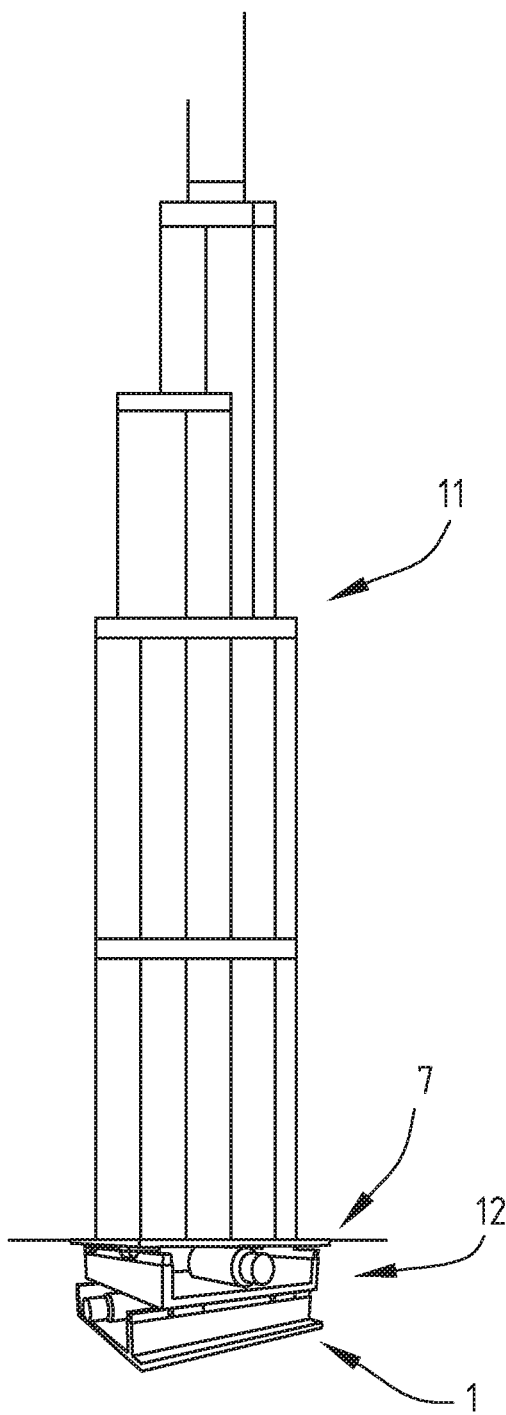
FIG. 4 shows an embodiment of the active foundation of the present invention with a building mounted as payload.

FIG. 4 illustrate an embodiment of the present invention that has a multistory tall building 14 as a possible object/payload 11, it marks the ground level and the active foundation 12 below. The image does not represent the realistic scale of the foundation compared to the building. Each pair of arrows represents an inversion of lateral ground motion in the respective direction.

Figure 5:
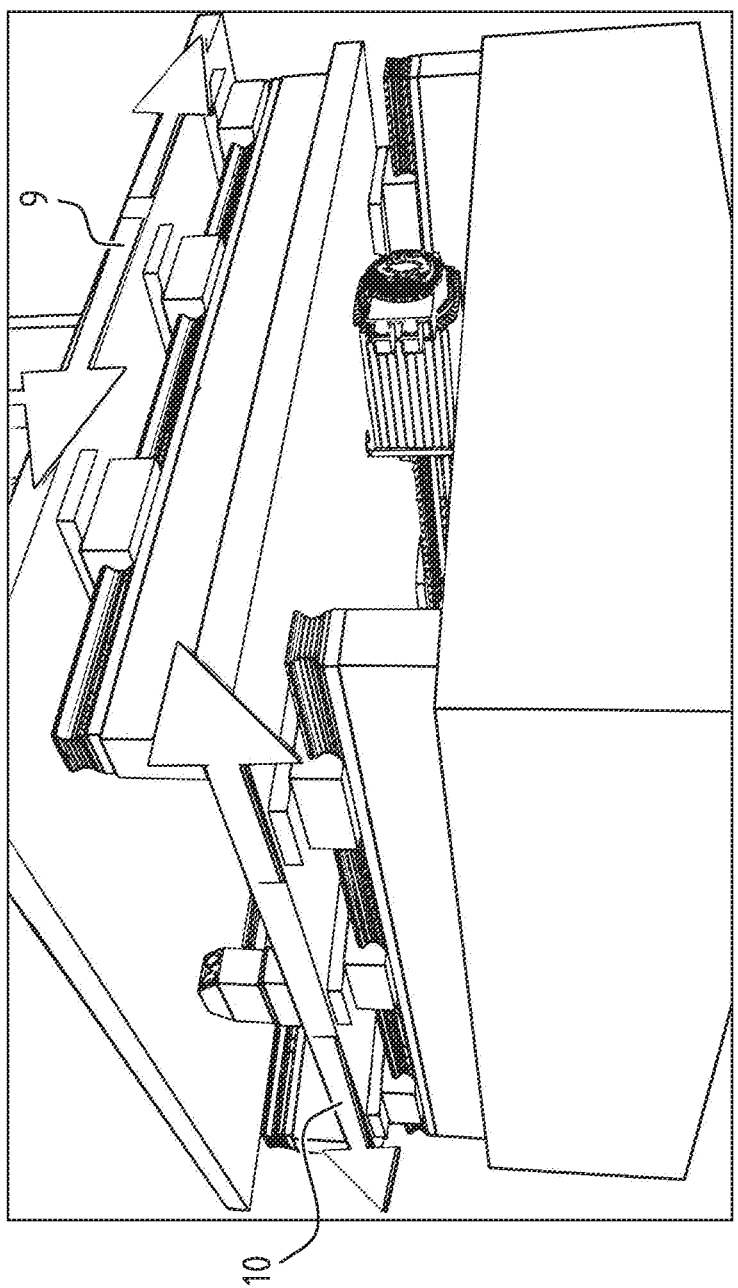
FIG. 5 is an illustration of split DOF's assembly, showing the inversion achieved for the X and Z ground motion components.

FIG. 5 shows the active foundation split Dof assembly. The pairs 9. 10 of arrows indicate the splitting of lateral motion components of the system where each level of the foundation is responsible for a single axis motion only.

Figure 6:
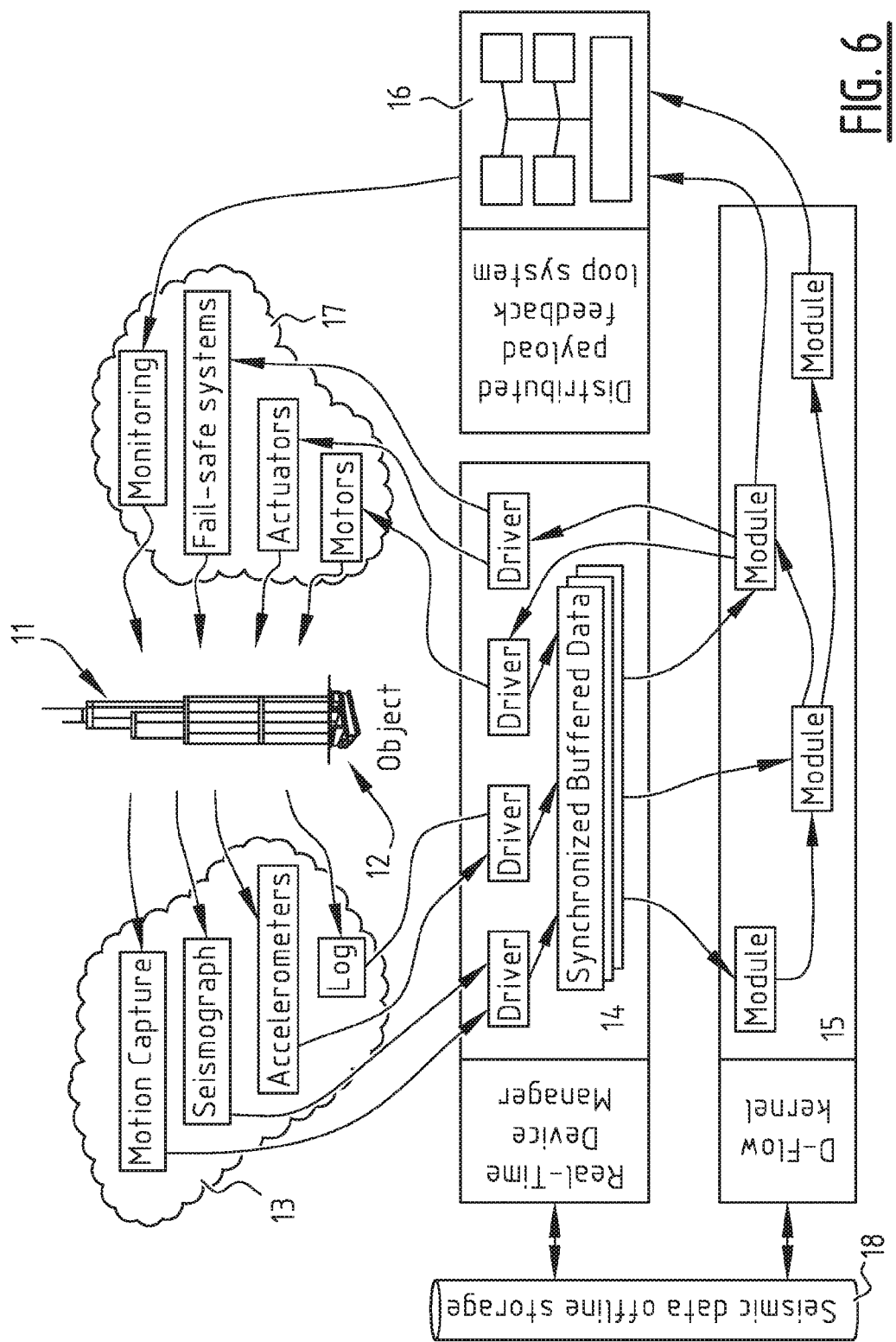
FIG. 6 illustrates the feedback loop software structure and processes between the various optional input sources and the active elements of the present invention.

FIG. 6 shows an overview of the feedback loop software architecture and structure. In this embodiment, a high-rise building 14 is used as an object/payload 11 mounted on the active foundation 12. The software structure creates a feedback loop between input sources 13 and output sources 17. The input sources can be Seismographs, Optical or inertial motion capture systems and accelerometer based devices. All the input sources in the present invention work at speeds higher then 100 Hz. All those input sources detect the presence of any seismic vibrations and ground movements. In addition, all input sources are being logged and input data can also be recorded in real time. Input data coming from the input sources 13 is being passed to the real-time device manager 14 which has specific software drivers per input device and specific software drivers for output sources 17. The real-time device manager also synchronizes data coming from different devices in different speeds into a unified timestamp. The real-time device manager also passes data to a seismic data offline storage 18 for storing and comparison of seismic events. The next element in the software structure is the feedback kernel 15. The feedback kernel 15 has specific modules that receive in real time the unified input data from the real-time manager 14 and parses it through custom modules that are responsible for the calculations needed to convert the seismic data to the formats needed by the output sources 17, the calculations needed to divide the data to separate Degrees of freedom (Dofs), the calculations needed to inverse correctly the separate Dofs data and the operations needed to send the data in real-time to the output sources 17. The feedback kernel 15 also passes data to a seismic data offline storage 18 for storing and comparison of seismic events. While the data is passed from input devices 13 to output devices 17 there is also continuous monitoring of the object/payload 11 state, balance and position. This is done in a separate block that is the distributed payload feedback loop system 16. While the actual elimination of the effect of ground motion on the object/payload 11 is done by the feedback kernel 15, there are continuous validation and fail safe checks done inside the distributed payload feedback loop system 16 that ensures that the object/payload 11 is staying still.

In a preferred embodiment of the current invention, the invention comprises an active system that fully isolate translational seismically generated motions from the object of structure above it. It includes the following features.

One or more input sources including a seismograph, accelerometer based devices or motion capture devices. A seismograph is an instrument that makes a record of seismic waves caused by an earthquake, explosion, or other earth-shaking phenomenon. Seismographs are equipped with electromagnetic sensors that translate ground motions into electrical changes, which are processed and recorded by the instruments' analog or digital circuits. In the context of the present invention, digital seismographs will be used. The generated digital data is treated as an input source to the active foundation system.

Accelerometer based devices are compound multi-axial sensors that house multiple accelerometers to detect and sense accelerations in three demotions. An accelerometer is a device that measures proper acceleration ("g-force"). Proper acceleration is not the same as coordinate acceleration (rate of change of velocity). For example, an accelerometer at rest on the surface of the Earth will measure an acceleration g=9.81 m/s2 straight upwards. By contrast, accelerometers in free fall orbiting and accelerating due to the gravity of Earth, will measure zero. Accelerometers have multiple applications in industry and science. Highly sensitive accelerometers are components of inertial navigation systems for aircraft and missiles. Accelerometers are used to detect and monitor vibration in rotating machinery. Accelerometers are used in tablet computers and digital cameras so that images on screens are always displayed upright. Accelerometers are used in drones for flight stabilization. Single- and multi-axis models of accelerometer are available to detect magnitude and direction of the proper acceleration. In the context of the present invention, the accelerometer based devices will generate digital 3D vector data. This data is also treated as an input source to the active foundation system. Motion capture devices deploy different process of recording the movement of objects or people. It is used in military, entertainment, sports, medical applications, and for validation of computer vision and robotics. Motion capture devices generate data that shows the position of captured active or passive markers in 3D space. There are 4 main types of motion capture devices, all applicable to the current invention. Those are: Optical, Magnetic, Inertial and mechanical motion capture systems.

One or more motors (hydraulic or electric actuators). A motor or actuator is a general term for a device that creates motion. It usually refers to an engine of some kind. There are many types of motors. The most relevant types of motors to the present invention are electric motors (converting electricity into a mechanical motion), Hydraulic motors (converting the energy of pressurized liquid flow into mechanical motion) and pneumatic motors (converting the energy of compressed air into mechanical motion).

One or more set of rails that are attached to the bottom part of the foundation. The rails are an integral part of the foundation bottom plate that is anchored to the ground. These rails are designed to carry the full payload of the object or structure that is mounted on the active foundation. The rails are designed in a form that reduces vertical friction and shear forces friction.

A plurality of load-bearing custom wheels mounted along the said rails. The load bearing wheels are taking the payload weight and allow movement across the rails in a single axis only. Since in most embodiments the payload weight is very big, additional mechanisms are integrated to lower friction on the rails.

One or more upper load plates on which the said load bearings are attached. The upper load plate is the element that is moving on the rails in the specified axis. This plate is similar in design to the bottom plate attached to the foundation, but is rotated horizontally in 90 degrees with respect to the bottom plate, to allow its own mounted rails to facilitate a second degree of freedom of the lateral movement.

A software tool that establishes real time feedback between said input sources and said motors. The software tool reads input from seismic sensors in the ground that detect in real time tremors or an earthquake. It also reads an input from sensors in the building or objects that detect in real time any offsets in the center of mass of the building/object. The software tool calculates through custom algorithms the inversion movements needed to be propagated to the multiplicity of rails and drives the motors that move the active foundation in a way that eliminates any movements to propagate to the payload.

Control computers running said real time feedback loop. The control computers run the software tool, and also are connected to early warning systems that alert of detected tremors and earthquakes before it reaches the active foundation location.

Multiple fail-safe instances of said elements. Several instances of the mentioned elements are present to cover for malfunction of any of the system elements. Some of the failsafe elements (like the computer systems and the motors/actuators are also connected to an emergency power source in case of the main grid being inactive.

In another preferred embodiment the invention is drawn to an active system configuration that is capable of eliminating also rotational propagation of seismically generated ground motions comprising: one or more input sources including a Seismograph, accelerometers or motion capture devices; one or more N-DOFs motion platforms (hydraulic or electric) that are set as the bottom part of the foundation; one or more set of rails that are attached to the top part of said motion platforms; a plurality of load-bearing custom wheels mounted along the said rails; one or more upper load plates on which the said load bearings are attached; a software tool that establishes real time feedback between said input sources and said motors; a control computer running said real time feedback loop; and multiple fail-safe instances of said elements.

The core of the system is in its active state. As soon as said input source (seismographs, accelerometers or motion capture devices) detects any ground motions in real-time, it processes the ground motion input through said software tool that feeds back these motions to said array of motors or motion platforms that the object or structure is mounted on. The processed signals cause the mounted object or structure to move in the exact inverse directions to the motion of the ground, thus keeping it always in the same static place.

The invention has thus been described by means of preferred embodiments. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawings shall be used to interpret the claims. The claims should not be interpreted as meaning that the extent of the protection sought is to be understood as that defined by the strict, literal meaning of the wording used in the claims, the description and drawings being employed only for the purpose of resolving an ambiguity found in the claims. For the purpose of determining the extent of protection sought by the claims, due account shall be taken of any element which is equivalent to an element specified therein.

The invention claimed is:

1. A system for preventing damage from an earthquake to an object, having a foundation anchored to a ground surface, which is generally horizontally oriented as defined relative to a gravitationally defined vertical direction, the system comprising:
   means for guiding mounted on the foundation and on the object for allowing relative displacement between the object and the foundation in at least one horizontal direction;
   at least one actuator is capable of displacing the object in the at least one horizontal direction relative to the foundation as allowed by the means for guiding;
   a central processing unit, where the at least one actuator is communicated with the central processing unit; and
   at least one displacement sensor,
   where the central processing unit is communicated with the at least one displacement sensor,
   where the at least one displacement sensor is capable of detecting a displacement of the foundation in real time and/or the ground surface and/or the object and capable of inputting displacement data in real time to the central processing unit, and
   where the central processing unit is programmed to activate the actuator in real time in dependence on the displacement data so that the object is displaced relative to the foundation in real time, such that a maximum horizontal displacement vector of the object is kept substantially smaller than a horizontal maximum displacement vector of the foundation.

2. The system of claim 1, wherein the central processing unit is programmed to activate the actuator in real time in dependence on the displacement data so that the object is horizontally displaced relative to the foundation in real time, such that the maximum displacement vector of the object is kept at substantially zero.

3. The system of claim 1, wherein the at least one displacement sensor includes a ground displacement sensor, the ground displacement sensor is capable of detecting horizontal displacement of the foundation in real time and/or of the ground surface and is capable of inputting displacement data in real time to the central processing unit, and where the central processing unit is programmed to activate the actuator in real time in dependence on the displacement data so that the object is horizontally displaced relative to the foundation in real time with a horizontal displacement vector which is substantially the opposite of the horizontal displacement vector of the foundation or the ground surface.

4. The system of claim 2, wherein the at least one displacement sensor includes a ground displacement sensor, the ground displacement sensor is capable of detecting horizontal displacement of the foundation in real time and/or of the ground surface and is capable of inputting displacement data in real time to the central processing unit, and where the central processing unit is programmed to activate the actuator in real time in dependence on the displacement data so that the object is horizontally displaced relative to the foundation in real time with a horizontal displacement vector which is substantially the opposite of the horizontal displacement vector of the foundation or the ground surface.

5. The system of claim 3, wherein the central processing unit is programmed to activate the actuator in real time in dependence on the displacement data using a predictive feedback loop.

6. The system of claim 1, wherein the at least one displacement sensor includes an object displacement sensor capable of detecting a horizontal displacement of the object in real time and is capable of inputting displacement data in real time to the central processing unit, and where the central processing unit is further programmed to activate the actuator in real time in dependence on the displacement data, so that the object is self-balanced on the means for guiding.

7. The system of claim 6, wherein the object is self-balanced on the guide means by using an inverted pendulum feedback control balancing algorithm.

8. The system of claim 7, wherein the inverted pendulum feedback control balancing algorithm comprises a fuzzy controller algorithm.

9. The system of claim 6, wherein the object has a lower portion and a upper portion, and where the detected displacement of the object includes a displacement of a lower portion of the object and of an upper portion of the object and/or the inclination of the object relative to the vertical direction.

10. The system of claim 7, wherein the object has a lower portion and a upper portion, and where the detected displacement of the object includes displacement of a lower portion of the object and of an upper portion of the object and/or the inclination of the object relative to the vertical direction.

11. The system of claim 8, wherein the object has a lower portion and a upper portion, and where the detected displacement of the object includes displacement of a lower portion of the object and of an upper portion of the object and/or the inclination of the object relative to the vertical direction.

12. The system of claim 1, wherein the at least one displacement sensor includes a seismograph, an accelerometer, an optical motion capture device, an electro-magnetic motion capture device, an inertial motion capture device, and/or a mechanical motion capture device.

13. The system of claim 1, wherein the means for guiding allows relative horizontal displacement between the object and the foundation in two different orthogonal horizontal directions.

14. The system of claim 1, wherein the means for guiding mounted on the foundation and on the object comprises:

rails mounted on one of the foundation or object;

support means mounted on and for supporting the other one of the foundation or object, where the support means are supported by the rails and move along the rails.

15. The system of claim 14, wherein the means for guiding comprises two sets of the actuator, rails, and support means, where the two sets are capable of displacing the object relative to the foundation, where the two sets extend on top of each other, where a first one of the rails extend in a first direction and the second one of the rails in the two sets extend in a second direction, and wherein the second direction is perpendicular to the first direction.

16. The system of claim 15, wherein the actuator of the first set is capable of displacing the rails of the second set relative to a first one of the foundation and object, and the actuator of the second set is capable of displacing the second one of the foundation and object relative to the rails of the second set.

17. A method for preventing damage from an earthquake to an object having a foundation anchored to a ground surface, which is generally horizontally oriented as defined relative to a gravitationally defined vertical direction, the method comprising:

providing means for guiding mounted on the foundation and on the object arranged to allow relative displacement between the object and the foundation in at least one horizontal direction;

providing at least one actuator capable of displacing the object in the at least one direction relative to the foundation, the at least one actuator being communicated to a central processing unit, the central processing unit being communicated with at least one displacement sensor;

detecting displacement of the foundation and/or the ground surface and/or the object the at least one displacement sensor using the at least one displacement sensor;

inputting displacement data in real time to the central processing unit; and activating the actuator in real time using the central processing unit in dependence on the displacement data so that the object is displaced relative to the foundation in real time, so that a maximum horizontal displacement vector of the object is kept substantially smaller than a maximum horizontal displacement vector of the foundation.

* * * * *